United States Patent [19]
Horton

[11] Patent Number: 5,952,248
[45] Date of Patent: *Sep. 14, 1999

[54] FIRE RETARDANT THERMAL AND ACOUSTIC INSULATION MATERIAL

[76] Inventor: Bill D. Horton, 417 W. Bentrup St., Chandler, Ariz. 85224

[ * ] Notice: This patent is subject to a terminal disclaimer.

[21] Appl. No.: 08/988,970

[22] Filed: Dec. 11, 1997

[51] Int. Cl.$^6$ .................................................. B32B 27/24
[52] U.S. Cl. .............................. 442/138; 442/65; 442/70; 442/74; 442/377; 442/388; 442/393; 427/209; 427/385.5; 427/389.9; 427/392; 427/393.3
[58] Field of Search .................................. 442/64, 65, 70, 442/74, 136, 138, 381, 388, 393, 378; 427/209, 385.5, 389.9, 392, 393.3

[56] References Cited

U.S. PATENT DOCUMENTS

| | | | |
|---|---|---|---|
| 3,574,644 | 4/1971 | Olstowski et al. | 106/15 |
| 3,726,738 | 4/1973 | Gellon et al. | 156/276 |
| 4,075,114 | 2/1978 | Ishikawa et al. | 252/62 |
| 4,107,376 | 8/1978 | Ishikawa | 428/306 |
| 4,419,256 | 12/1983 | Loomis | 252/62 |
| 4,514,327 | 4/1985 | Rock | 252/607 |
| 4,698,369 | 10/1987 | Bell | 521/99 |
| 4,722,945 | 2/1988 | Wood et al. | 521/65 |
| 4,847,140 | 7/1989 | Jaskowski | 428/220 |
| 4,965,296 | 10/1990 | Hastings | 523/179 |
| 5,110,413 | 5/1992 | Steer | 162/145 |
| 5,232,976 | 8/1993 | Horacek et al. | 524/495 |
| 5,294,300 | 3/1994 | Kusuyama | 162/157.3 |
| 5,384,188 | 1/1995 | Lebold et al. | 428/283 |
| 5,443,894 | 8/1995 | Polllock et al. | 428/213 |

Primary Examiner—Christopher Raimund
Attorney, Agent, or Firm—Cahill, Sutton & Thomas PLC

[57] ABSTRACT

An open weave, air permeable fiber pad is formed from a plurality of compressed, interlocked fiber strands. A non-uniform, three dimensional grid of spaced apart, expandable graphite particles are secured at randomly spaced apart intervals to individual fiber strands with a particle distribution density sufficient to form a barrier to air flow through a defined area of the fiber pad when exposed to a source of heat causing the expandable graphite particles to be converted from their normal volume to a heat-activated, substantially expanded volume.

39 Claims, 6 Drawing Sheets

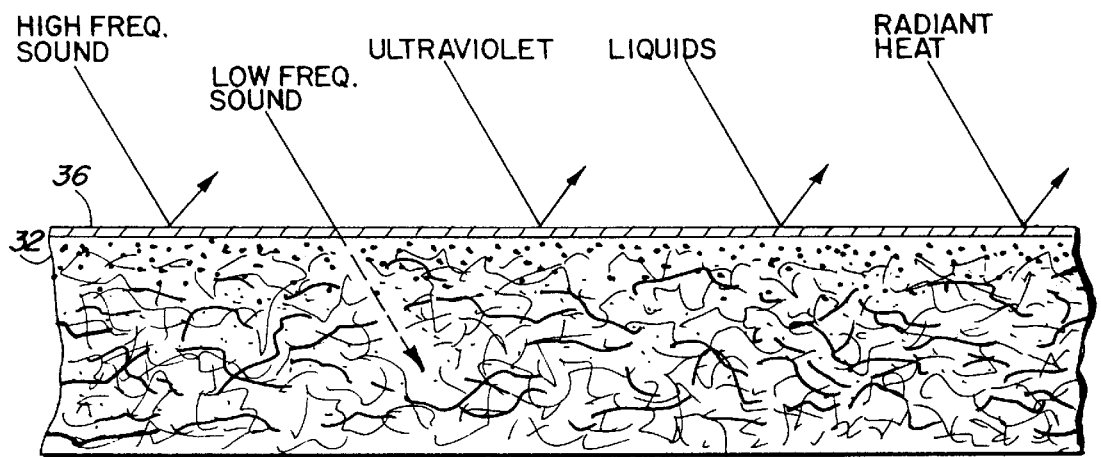
FIG. 10
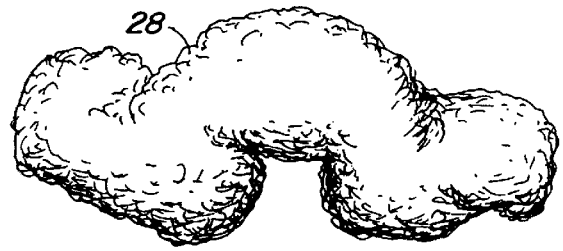
FIG. 11
FIG. 12
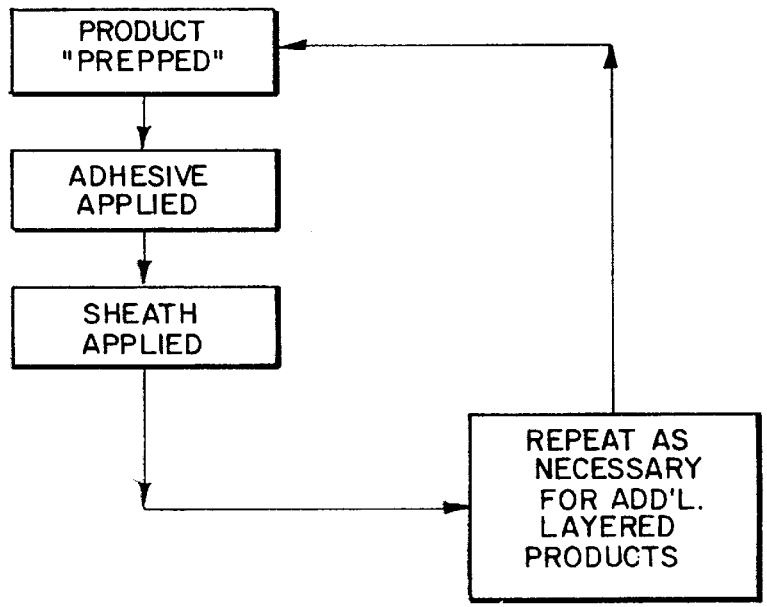
FIG. 13

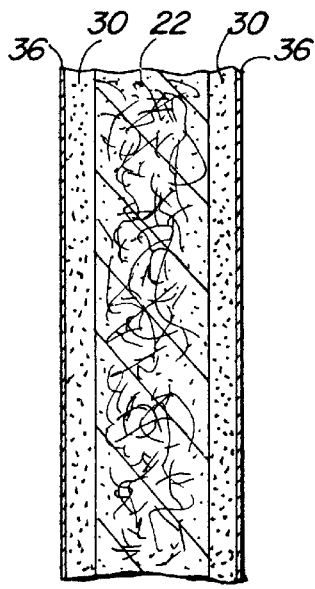
FIG._14
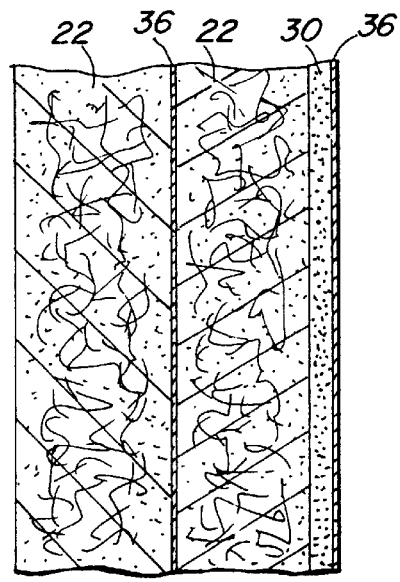
FIG._15
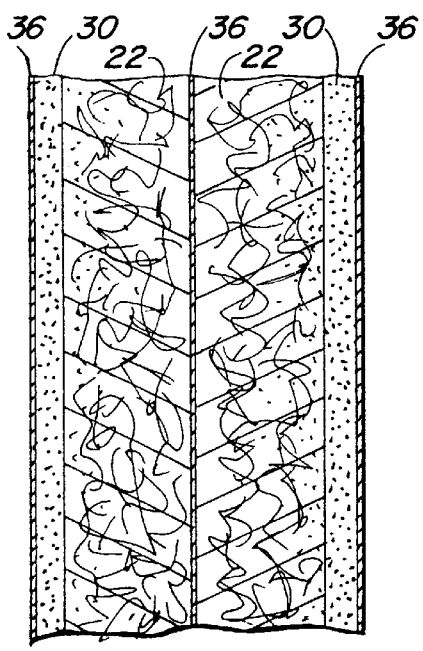
FIG._16
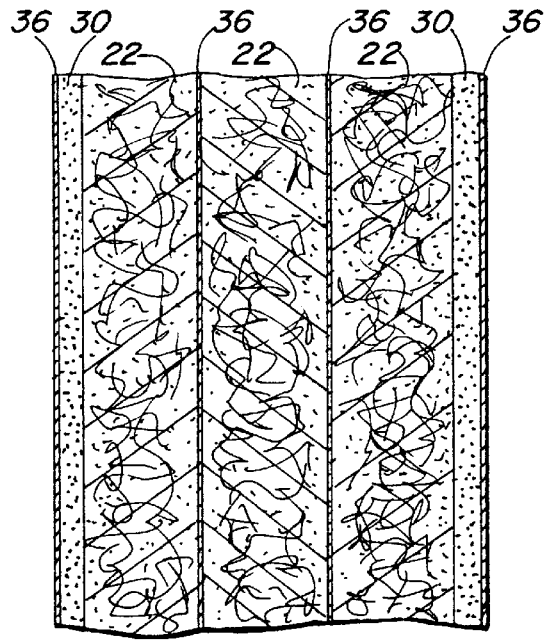
FIG._17

P1

P2

FIRE RETARDANT THERMAL AND ACOUSTIC INSULATION MATERIAL

BACKGROUND OF THE INVENTION

1. Field of the Invention

This invention relates to fire retardant materials, and more particularly to fire retardant thermal and acoustic insulation materials.

2. Description of the Prior Art

The term "non-woven textile clipping pad" refers to a relatively thin, highly flexible pad material fabricated from recycled scrap fabric and carpet remnants used for applications such as mattress pads, furniture pads and carpet pads. This material can be described as an open weave, air permeable fiber pad formed from a plurality of compressed, interlocked fiber strands having a generally uniform thickness with non-uniform first and second side surfaces which are defined by a plurality of exposed, interlocked strands.

A layer of aluminum foil or an aluminized polyester sheet can be bonded to one or both sides of the fiber pad material to create a product which reflects heat and high frequency sound and has the capability of absorbing or attenuating low frequency sounds. The aluminum layers enhance the heat reflective and heat insulating properties of the fiber pad material rendering it potentially useful for automotive or aircraft sound reduction and heat insulating applications.

The pad material is fabricated from a wide variety of chopped, slashed, recycled scrap including cotton and cotton/polyester fabrics where the length of the resulting chopped fiber strands as well as the material composition and individual strand diameter results in a flexible, relatively strong pad material but with a highly non-homogeneous, non-uniform composition.

In an effort to meet the fire retardancy standards mandated by the Federal Aviation Administration (FAA) for use in private and commercial aircraft, by the U.S. Coast Guard for use in private and commercial water craft and by the Department of Transportation for use in private and commercial vehicles and by various local and federal agencies for use in the construction of homes and commercial buildings, attempts have been made to render this highly flammable pad material both flame and fire retardant.

A commercially available liquid fire retardant sold under the trademark AMSPERSE FR-21 has been coated onto the exterior surface of this pad material and has been injected into the pad material in an effort to enhance the fire resistance characteristics of the flammable pad material. Because the pad includes widely varying percentages of recycled nylon, rayon, cotton, polyester and related materials and because the length and diameter of the various fiber strands vary widely, the addition of liquid AMSPERSE fire retardant chemical to the pad material somewhat reduced its flammability but the pad material still burns and emits smoke, but at a slower rate than for untreated pad material. Even though consistent amounts of the chemical flame retardant was added to the pad material during its manufacture, inconsistent test results were obtained during the course of burn testing due to the non-homogeneous, widely varying nature of the recycled fiber materials and wide variations in the relative ratios of different categories of recycled fiber input materials.

Requests to supply pad compositions having a more uniform fiber content were rejected by the pad manufacturers as economically impractical as a result of the requirement that all of the randomly varying recyclable input materials be utilized. While treatment of the pad material with chemical flame retardants somewhat reduced its flammability, some, but not nearly all, fire retardant standards could be met by pad material treated with AMSPERSE fire retardant.

After lengthy research and development efforts, and although aluminum foil coated pad materials yielded highly advantageous thermal and acoustic insulation properties, non-woven textile clipping pad could not be modified to achieve a high level of resistance to fire and flame.

SUMMARY OF THE INVENTION

It is therefore a primary object of the present invention to provide a fire retardant thermal and acoustic insulation material which can be manufactured at low cost, which demonstrates a high level of acoustic and thermal insulation and which represents an essentially flame-proof, self-extinguishing material.

Yet another object of the present invention is to provide a fire retardant thermal and acoustic insulation material which can be covered with a layer of aluminum foil to substantially enhance the thermal and acoustic insulating properties of the material.

Yet another object of the present invention is to provide a fire retardant thermal and acoustic insulation material which can be manufactured using existing pad manufacturing equipment at high speed and at relatively low cost.

Still another object of the present invention is to provide a fire retardant thermal and acoustic insulation material in which sequential layers of pad material and aluminum foil can be laminated together to achieve substantially enhanced thermal and acoustic insulating properties.

Briefly stated, and in accord with one embodiment of the invention, a fire retardant thermal and acoustic insulation material is fabricated from an open weave, air permeable fiber pad formed from a plurality of compressed, interlocked fiber strands. The fiber pad includes a generally uniform thickness with non-uniform first and second side surfaces defined by a plurality of exposed, interlocked strands. A first non-uniform three dimensional grid is created from a plurality of spaced apart, expandable graphite particles. The expandable graphite particles possess a normal volume and a heat-activated, substantially expanded volume. The grid is defined by a plurality of expandable graphite particles bonded at randomly spaced apart intervals to individual fiber strands with a particulate distribution density sufficient to form a barrier to air flow through a defined area of the fiber pad. The air flow barrier is created when the defined area of the fiber pad is exposed to a source of heat and the expandable graphite particles within that area are activated to convert individual particles from the normal volume to the expanded volume.

The process of manufacturing the fire retardant thermal and acoustic insulation material begins with the step of forming an open weave, air permeable fiber pad by arranging a plurality of fiber strands into layers and by combining a series of layers into a single mat. The first and second side surfaces of the pad are then compressed to reduce the pad thickness. At least one side of the compressed pad material is injected with a pressurized mixture of a liquid bonding material and expandable graphite particles to produce a first region of fiber strands which had been wetted by the liquid bonding agent. Because the liquid bonding agent has been mixed with expandable graphite particles, injecting that mixture into the pad material yields a predetermined distribution density of expandable graphite particles. The pad is then dried to extract the liquid from the liquid bonding material to thereby bond the fiber strands into a compressed, interlocked state to yield a pad having a generally uniform thickness with non-uniform first and second side surfaces defined by a plurality of exposed, interlocked strands. The drying step further bonds the expandable graphite particles to the fiber strands and creates a first, non-uniform, three-dimensional grid of spaced apart particles with a particle distribution density sufficient to form a barrier to air flow through a first defined area of the fiber pad when that defined area is exposed to a source of heat causing the expandable graphite particles to be activated and converted from the normal volume to the expanded volume.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 10 represents a partially cutaway fire retardant thermal and acoustic insulation material showing how it either reflects or absorbs high frequency sound, low frequency sound, ultraviolet rays, liquids and radiant heat.

FIG. 11 illustrates a single particle of expandable graphite in its normal volume state.

FIG. 12 illustrates a single particle of expandable graphite in its heat-activated, substantially expanded volume form.

FIG. 13 represents a flow chart illustrating a method for creating a multiple layer, aluminized fire retardant thermal and acoustic insulation material.

FIG. 14 represents a partially cutaway sectional view of a fire retardant thermal and acoustic insulation material including first and second spaced apart, non-uniform, three-dimensional grids of expandable graphite particles as well as first and second spaced apart aluminum foil exterior layers.

FIG. 15 represents a partially cutaway sectional view of a fire retardant thermal and acoustic insulation material including a single non-uniform three-dimensional grid of expandable graphite particles, two layers of fiber pad and two layers of aluminum foil.

FIG. 16 represents a partially cutaway sectional view of a fire retardant thermal and acoustic insulation material including first and second three-dimensional grids of expandable graphite particles, two laminated fiber pads and three layers of aluminum foil.

FIG. 17 represents a partially cutaway sectional view of a fire retardant thermal and acoustic insulation material including first and second three dimensional grids of expandable graphite particles, three layers of fiber pad and four layers of aluminum foil.

DESCRIPTION OF THE PREFERRED EMBODIMENT

In order to better illustrate the advantages of the invention and its contributions to the art, a preferred embodiment of the invention will now be described in detail.

A basic element of the fire retardant and acoustic insulating material of the present invention represents a standard, mass-produced product known in the field as a "non-woven textile clipping pad." Such products are commercially available from Leggett & Platt of Nashville, Tenn. as well as from other pad manufacturing companies. This pad material can be described as a non-woven, air permeable fiber pad manufactured from scrap fiber materials such as fabric scrap and carpet remnants. The garment industry, including companies such as Haines, Fruit of the Loom, and Levi, represents the primary source of fabric scrap which results from manufacturing overruns, rejected finished product and miscellaneous scrap materials. Such fibrous scrap materials predominantly include cotton and cotton/polyester blends, but can also include nylon, rayon and related fiber materials. The raw material input to the textile clipping pad manufacturer varies widely as to both fiber category (cotton, polyester, rayon and nylon) as well as with respect to the physical properties of the fiber strands including strand diameter, thread count, thread color and thread density.

The fiber input material is typically delivered to the textile clipping pad manufacturer in five hundred pound bales which are initially processed and mixed in large bins and are then fed to chopping and shredding machines which convert the fiber-based input materials into a light, fluffy material consisting of loosely linked fiber strands of variable, but generally short lengths.

Figures 8, 9:
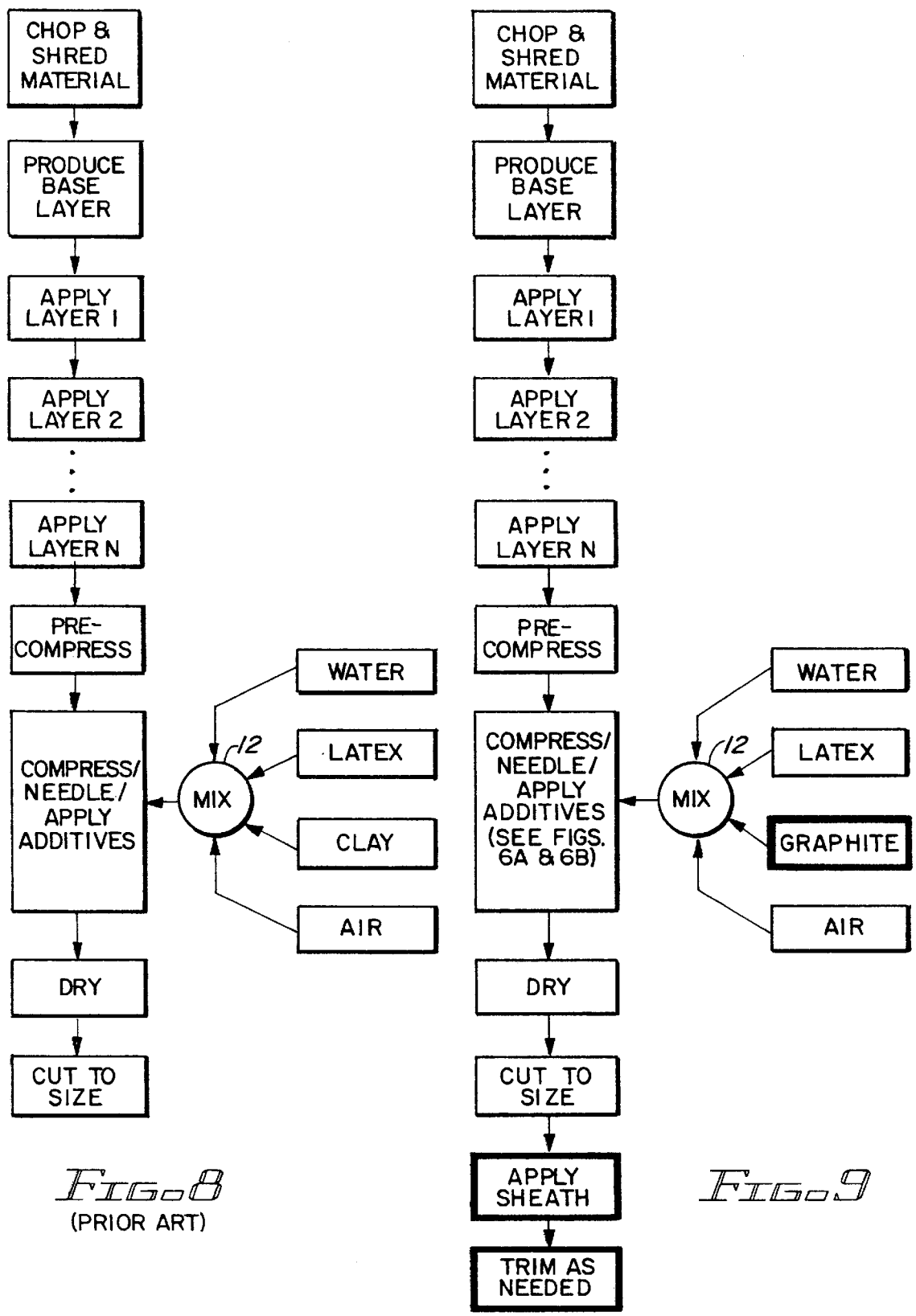
FIG. 8 represents a flow chart depicting a prior art process for manufacturing non-woven textile clipping pad.
FIG. 9 represents a flow chart illustrating various changes and modifications to the FIG. 8 prior art process.

The FIG. 8 flow chart generally describes the prior art process for manufacturing non-woven textile clipping pad. As shown after the chopping and shredding step, a series of fluffy layers of fiber strands are superimposed to create a relatively thick (several inches thick), layered, loose fluffy material. The fluffy material is transported by conveyor belts through a combing and light compressing process until a sufficient thickness of fibrous fluffy material has been stacked together to yield a standard pad density, typically twenty-seven to thirty-six ounces per square yard.

The FIG. 8 flow chart next illustrates that the fiber stranded material is then directed to a standard compression/needling/foam injection fixture 10 where a controlled mixture of water, latex, finely ground clay filler and pressurized air is mixed in mixing chamber 12 and routed to a manifold structure 14 having a plurality of needles 16, a matching plurality of needle receiving apertures 18 and a laterally offset plurality of foam injection nozzles 20.

The liquid based latex/clay slurry mixture is injected through upper and lower surfaces of clipping pad 22 to effectively saturate the various fiber strands with the foam slurry. Fixture 10 is typically configured to provide a needle density of about one thousand needles per square foot. The needling process assists in compressing pad 22 while simultaneously mechanically bonding adjacent, independent fiber strands to each other to enhance the mechanical strength of the resulting clipping pad 22. The thickness of the resulting pad is controlled by a variety of parameters, but principally by the weight density of the fluffy, layered fiber strand material which is passed into the input side of fixture 10.

As reflected by the FIG. 8 flow chart, the material transferred from the output side of fixture 10 is routed to a drying oven which removes the water from clipping pad 22 causing the latex bonding material to cure to yield clipping pad 22 including a plurality of compressed, interlocked fiber strands which are both mechanically interlocked by the needling process as well as bonded together by the latex bonding agent.

The clipping pad produced according to the prior art process illustrated in the FIG. 8 flow chart represents a relatively flammable material which, upon ignition, is completely burned in a relatively short period of time. When a conventional liquid fire retardant chemical such as AMSPERSE fire retardant is either injected into clipping pad 22 through fixture 10 or is painted onto the exterior surfaces of the pad, the overall fire retardant properties of the pad material are enhanced only to a limited degree. Specific testing of clipping pad material treated with AMSPERSE chemical fire retardant only reduced the rate of combustion of the pad material, but did not render it either self-extinguishing or flameproof.

Referring now to the modified FIG. 9 flowchart and FIGS. 1–7, modification of the prior art FIG. 8 process as explained below achieved a dramatic improvement in the ability of clipping pad 22 to resist direct flame and to ultimately self extinguish any smouldering or burning pad material by creating an air flow barrier on the outer region of the pad which converts the open weave, air permeable fiber pad within that depth region into an air impermeable, self-extinguishing material.

As illustrated in the FIG. 9 flow chart, the water/latex/clay recipe used to manufacture prior art clipping pad material is modified by introducing eighty-eight pounds of expandable graphite particles as a substitute for two hundred pounds of clay. The mixture of water, latex and expandable graphite is continuously stirred to create a relatively uniform slurry.

Figure 6A:
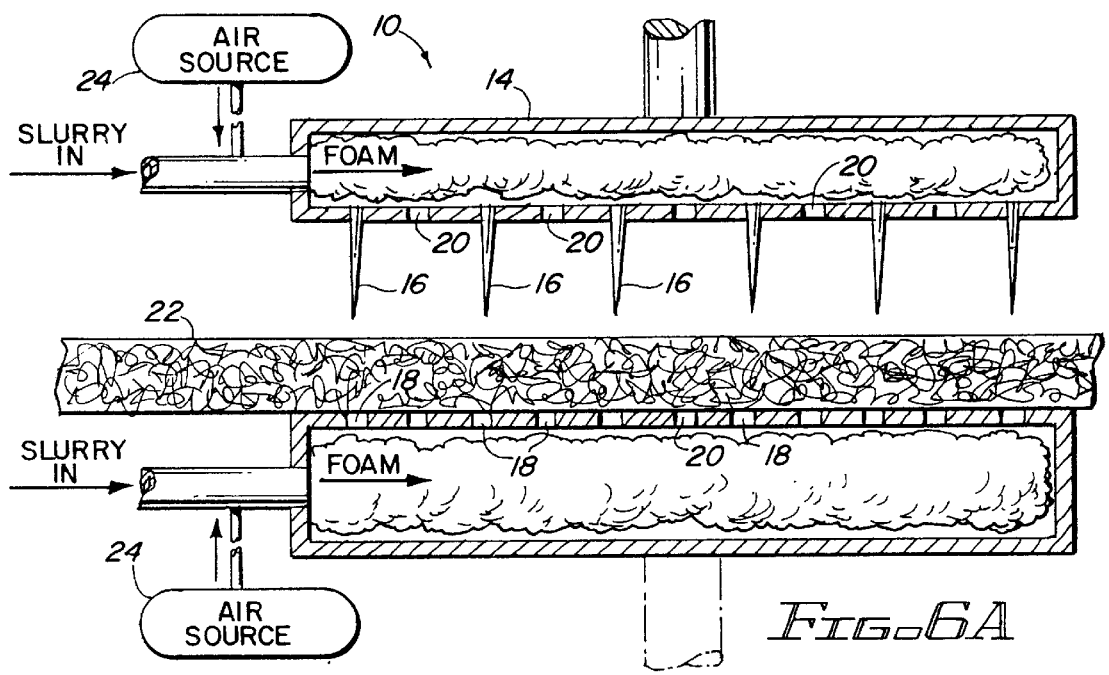
FIG. 6A illustrates the open weave, air permeable fiber pad being routed through a fixture for compressing and needling the pad while simultaneously injecting a foamed slurry into the mat.
Figure 6B:
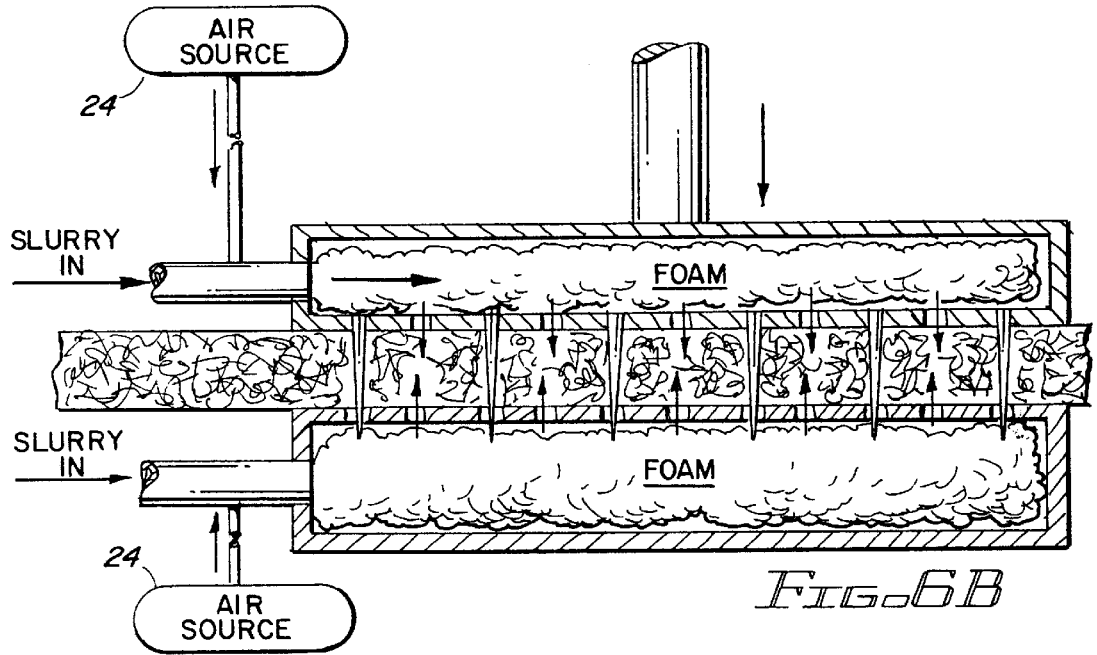
FIG. 6B illustrates the fixture shown in FIG. 6A in the active state where the steps of compressing, needling and foam injection are being performed.
Figure 7:
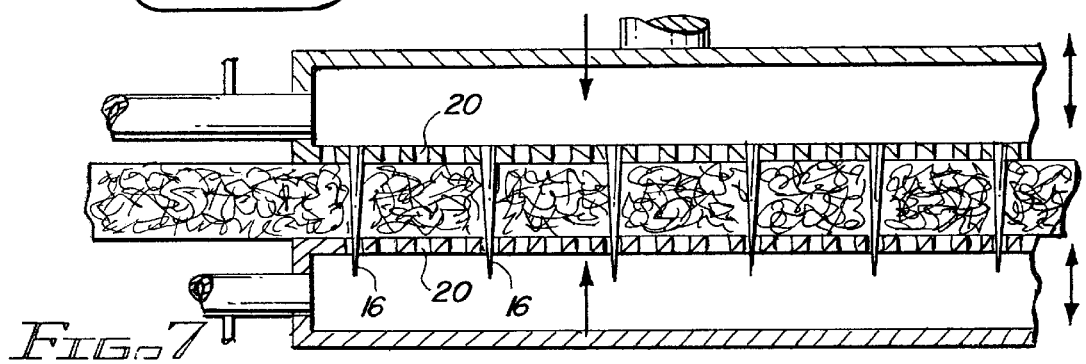
FIG. 7 illustrates the equipment shown in FIGS. 6A and 6B after the foam injection step has been completed.

Referring now to FIGS. 6 and 7, this latex/expandable graphite slurry (with or without additional clay) is directed to compression/needling/foam injection fixture 10 which, when activated as shown in FIG. 6B, brings manifold members 14 together. Air source 24 is then activated to generate a bubbly foam material within manifold 14. Typically, expandable graphite particles are injected by the pressurized foam into the upper surface of clipping pad 22 with significant concentrations to within a distance of from one thirty-second to one sixteenth of an inch below the surface. Lower concentrations of expandable graphite particles may be injected more deeply below the surface of pad material 22 with particle density decreasing as a function of distance from the pad source, but it has been found that full thickness injection of expandable graphite particles has not been required to achieve the fire retardant, self-extinguishing properties required for commercial aircraft applications. The foam mixture may be injected through the upper surface of the pad through the lower surface of the pad, or through both the upper and lower surfaces of the pad.

Following the foam injection process described above, pad 22 is routed to the drying oven shown in the FIG. 9 flowchart where water is removed from the pad causing the latex bonding material to cure.

Figure 1:
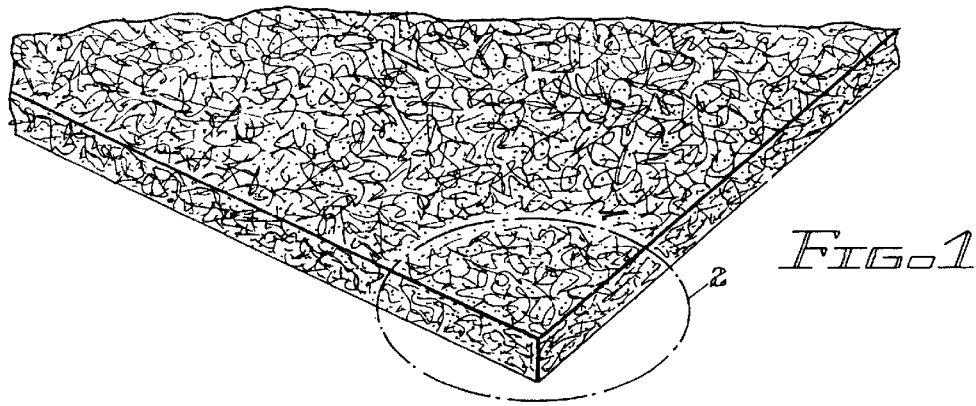
FIG. 1 represents a partially cutaway perspective of a fire retardant thermal and acoustic insulation material.
Figure 2:
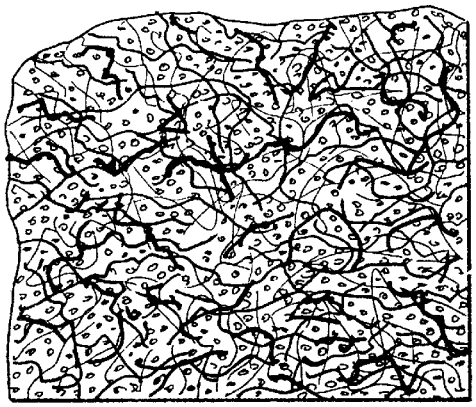
FIG. 2 represents a view from above of the insulation material shown in FIG. 1 lying within the area designated by section line 2.
Figure 3:
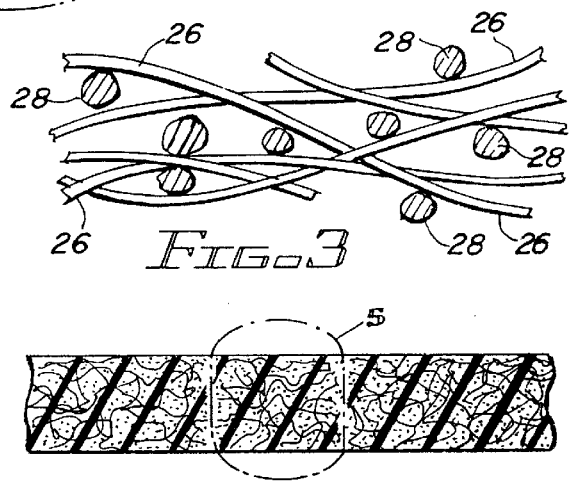
FIG. 3 represents a highly expanded, simplified sectional view of the insulation material illustrated in FIG. 1 showing the manner in which fiber strands and expandable graphite particles have been formed into a compressed, interlocked state.
Figure 4:
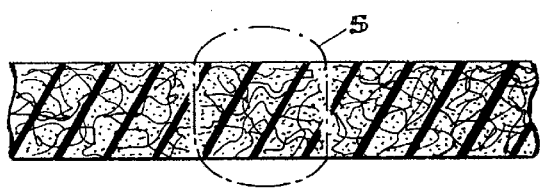
FIG. 4 represents a partially cutaway sectional view of the insulation material illustrated in FIG. 1.

FIG. 3 symbolically illustrates a small, highly magnified section of the non-woven, air permeable fiber pad after having been compressed and after the latex bonding material has been cured to form a plurality of crosslinked and interlocked fiber strands defining a non-uniform open structural lattice. As illustrated in FIG. 3, a series of fiber strands 26 of varying length, varying diameter and typically of different material (cotton, polyester, rayon, nylon, etc.) have been compressed into the layered, interlocked configuration shown and are held together first by the mechanical needling process and second by the bonding effect provided by the cured latex bonding agent. In the random distribution of expandable graphite particles 28 illustrated in FIG. 3, the individual particles 28 are surrounded by a protective coating of cured latex as a result of the foam injection process described above.

Figure 5A:
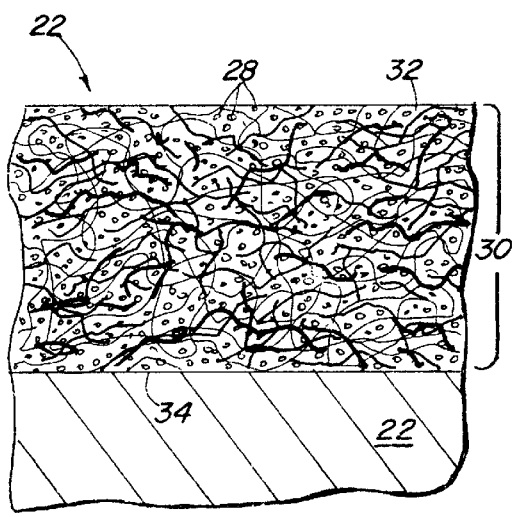
FIG. 5A represents a partially cutaway sectional view of the insulation material illustrated in FIG. 4 within the area designated by section line 5 showing the expandable graphite particles in their normal volume state.
Figure 18:
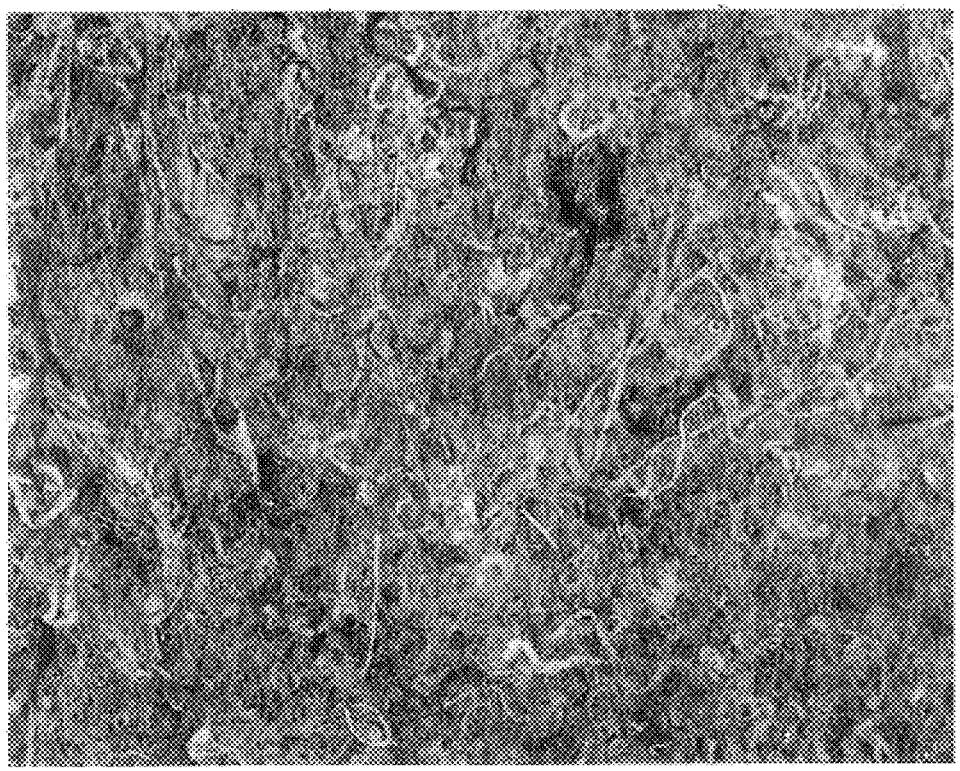
FIG. 18 and FIG. 19 represent an enlarged photographic view from above and an enlarged photographic view from the side of an actual specimen of a fire retardant thermal and acoustic insulation material embodying the present invention.
Figure 19:
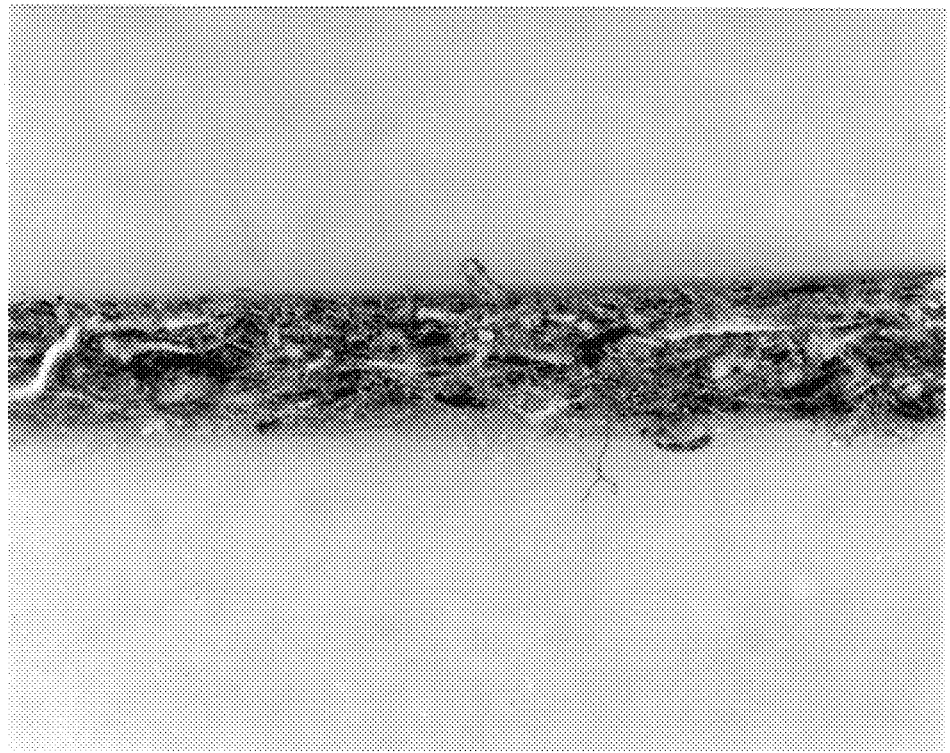

In the resulting fire retardant pad product as illustrated in FIGS. 3 and 5A, clipping pad 22 includes a non-uniform, three dimensional grid 30 of spaced apart, expandable graphite particles 28 extending from pad outer surface 32 to an inner boundary 34. In FIG. 5A, particles 28 are shown in their normal volume. In the preferred embodiment of the invention, the expanded graphite particles are rated at a mesh size of eighty (eighty percent probability) with a significant percentage of smaller particles. Photographic FIGS. 18 and 19 illustrate the non-uniform, three dimensional grid of expandable graphite particles (black, sand-like particles) in an actual clipping pad specimen.

By use of the specific foam injection and needling mechanisms illustrated in FIGS. 6 and 7, the particle distribution density either remains relatively constant between boundaries 32 and 34 or decreases as a function of distance or spacing from outer surface boundary 32. While lower boundary 34 has been referred to by the term "boundary," persons of ordinary skill in the art will readily recognize that numerous expandable graphite particles will be injected to a depth well below lower boundary 34 but at a substantially reduced particle concentration or density.

The expandable graphite used in implementing the preferred embodiment of the invention was purchased from the Alumina Trading Company of Parkridge, N.J. The preferred product is identified by grade 9980200 which is rated as having a maximum expansion volume of two hundred milliliters per gram. Such expandable graphite particles typically expand in volume one hundred and twenty-five times their original volume at a temperature of five hundred degrees Fahrenheit to as large as one hundred and eighty times their original volume when exposed to temperatures of one thousand degrees Fahrenheit. The typically flake-like or sand-like particles of expandable graphite upon exposure to an adequate amount of heat expand from their normal manufactured volume as illustrated in FIG. 11 to their heat-actuated, substantially expanded volume and thereby assume an accordion-like or worm-like shape as generally illustrated in FIG. 12.

Figure 5B:
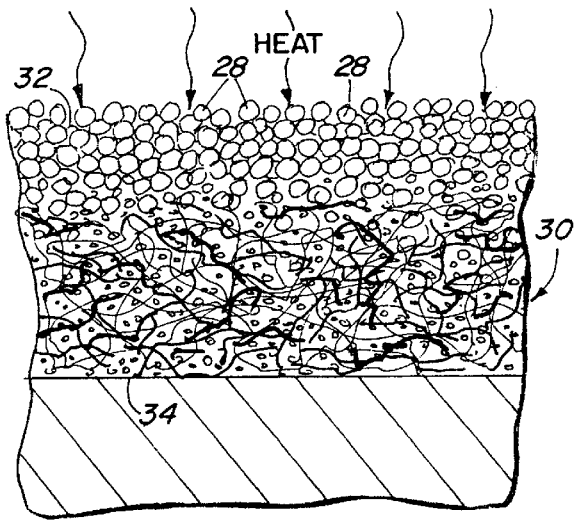
FIG. 5B represents a partially cutaway sectional view of the insulation material illustrated in FIG. 4 within the area designated by section line 5 showing the expandable graphite particles in their heat-activated, substantially expanded volume.

As symbolically illustrated in FIG. 5B, the heat activation of expandable graphite particles 28 transforms heated particles from the normal volume into their substantially expanded volume state throughout the area of grid 30 which receives an amount of heat energy sufficient to increase the temperature of the particles to their heat activation temperature. The heat activated, expandable graphite particles expand from their widely spaced apart, normal volume as illustrated in FIGS. 3 and 5A into their heat-activated, substantially expanded volume as illustrated in FIG. 5B creating a physical or mechanical barrier to air flow throughout the entire surface area and depth of the fiber pad which is exposed to heat and includes an adequate concentration and distribution of graphite particles. The formation of this air impermeable barrier cuts off the supply of oxygen required for combustion to the pad fiber strands which have been heated beyond their point of ignition and very promptly causes these fiber strands to self-extinguish.

In practice, exposure of the surface of clipping pad 22 produced according to the present invention to an open flame creates a charred surface giving off a low volume of light smoke which four seconds after removal of the direct source of flame completely self-extinguishes, terminating the source of smoke. The pad chars, but does not normally burn.

The very stringent FAA flame test requires that a fire retardant material self-extinguish within fifteen seconds after removal of the flame source with a burn length not exceeding eight inches during that fifteen second interval to qualify that material for use in commercial passenger aircraft. The expandable graphite-treated pad manufactured according to the present invention by manifesting a four second self-extinguishing property readily meets the extremely stringent FAA flame test.

To substantially enhance the thermal and acoustic insulating properties of the present invention, the outer surface 32 of clipping pad 22 is typically covered with a layer of aluminum foil 36 typically having a thickness of one mil or two mils with one mil being preferred. Depending on the application of pad 22, aluminum foil layer 36 is bonded to the outer surface 32 of pad 22 by a high temperature adhesive where the temperature rating of the adhesive is selected according to the particular application of the insulation material. For the highest rated FAA-type insulation material, a special four hundred degree rated adhesive produced by the Fiber-Resin Corporation of Chatsworth, Calif. and designated by Model No. FR7127 is typically used to provide high temperature rated bonding between foil layer 36 and pad 22. For less stringent fire resistance ratings, lower temperature rated adhesives available at lower cost can readily be procured and used to serve the same aluminum foil to pad bonding function.

FIG. 13 represents a flow chart illustrating the relatively straightforward process for adhesively bonding aluminum foil or sheeting layer 36 to pad 22 involving the spray application of adhesive to the exposed surfaces of pad material 22 and the aluminum foil sheet 36 before bonding the aluminum to the pad. Alternatively, a heat activated adhesive procured in rolled sheet form may be placed between the exposed surface of pad 22 and aluminum foil sheet 36 with the adhesive being subsequently heat-activated by appropriate equipment well known to those skilled in the art. For medium temperature applications an adhesive rated for temperatures on the order of two hundred and eighty to three hundred degrees Fahrenheit may be used instead of the high temperature rated four hundred degree Fahrenheit adhesive described above.

FIG. 10 illustrates that aluminum foil 36 serves to provide an acoustic insulating function by reflecting high frequency sound as well as a thermal insulating function by reflecting ultraviolet rays and radiant heat rays. The open weave, air permeable structure of fiber pad 22 receives and significantly attenuates low frequency sound as well as providing significant acoustic attenuation.

FIG. 14 illustrates a pad material including a grid 30 of spaced apart expanded graphite particles injected into both exterior surfaces of pad 22 in combination with a pair of opposing aluminum foil sheets 36 to significantly increase the fire retardant thermal and acoustic insulation properties of the single-sided insulation material illustrated in FIG. 10.

FIG. 15 illustrates a laminated embodiment of the insulation material of the present invention including two thicknesses of pad 22, a single grid of expandable graphite particles 30 and two spaced apart layers of aluminum foil.

FIG. 16 represents an enhanced version of the FIG. 15 laminated insulation material having three layers of aluminum foil and a pair of grids of expanded graphite material 30 in proximity to both exposed outer surfaces of the overall material product.

FIG. 17 represents a three layer laminated insulation material including four layers of aluminum foil 36 and a pair of opposing grids 30 of expandable graphite particles in combination with three pads 22.

The thickness of the pad material of the present invention can vary widely, but typically the FIG. 14 embodiment of the invention is manufactured with a thickness on the order of five sixteenths to three eights of an inch. The FIG. 15 embodiment of the invention includes an overall thickness of on the order of three quarters to seven eighths of an inch consisting of a first layer of seven sixteenths of an inch and a second layer of five sixteenths to three eights of an inch. The FIG. 16 embodiment of the invention includes an overall thickness of approximately five eights to three quarters of an inch, while the FIG. 17 embodiment of the invention includes a thickness of from about seven eighths to about one inch.

The fire retardant thermal and acoustic insulation material of the present invention in its most challenging application can be used to provide thermal and acoustic insulation between the interior surface of a pressurized commercial airliner fuselage and the aircraft cabin. The single layer insulation material of the present invention with dual aluminum layers provides a high order of thermal insulation while providing substantial acoustic insulation between the aircraft fuselage and the aircraft cabin while simultaneously providing a relatively fire resistant, self-extinguishing barrier between the exterior and interior surfaces of the aircraft fuselage.

The fire retardant thermal and acoustic insulation material of the present invention can also be used as a fire retardant mattress pad, as a fire retardant furniture pad or as a fire retardant carpet pad. For multi-story buildings, especially multi-story apartment buildings, the enhanced fire resistance provided by the insulation material of the present invention when used as a carpet pad not only significantly reduces the transmission of sounds from one level of the building to another, but also provides a meaningful additional period of time before a fire on an upper floor penetrates through the ceiling into an adjacent, lower floor. Such additional time provides apartment occupants with additional time to escape.

For mattress pad and furniture pad applications, the self-extinguishing property of the insulation material of the present invention may prevent a cigarette-induced burn from turning into a fire, or may at least delay the onset of a fire.

While the preferred process for manufacturing the fire retardant thermal and acoustic insulation pad of the present invention has been described in connection with injecting a predetermined concentration of expandable graphite particles through and below the exterior surface of an open weave, air permeable fiber pad, meaningful fire retardant performance may also be provided by painting or otherwise providing an exterior coating of expandable graphite particles in a latex base onto the non-uniform first and second side surfaces defined by the plurality of exposed, interlocked fiber strands of the pad material. The highest level of superior performance is achieved, however, when the expandable graphite particles are injected below the non-uniform surface or surfaces of the pad material.

While the upper and lower limits of the optimum expandable graphite concentration has not yet been determined, the test for an adequate concentration and depth of expandable graphite particles is primarily an empirical one based on testing and the observation of effective, meaningful fire retardant results. For aircraft applications, the specific formulation has been addressed above where two hundred pounds of clay is replaced by eighty-eight pounds of expandable graphite particles. The dried pad material includes approximately ten to seventeen percent weight concentration of clay, expandable graphite and latex. Approximately a three to five weight percent concentration of expandable graphite particles is presently preferred, with approximately a two weight percent concentration believed to represent the minimum effective weight concentration. Visual observation indicates an estimated particle density of approximately two hundred particles per square inch. For less rigorous, non-aircraft applications, lower concentrations of expandable graphite particles could be implemented until the fire retardant characteristics achieved by the present invention has been reduced below a minimum acceptable threshold. For FAA commercial airline applications, subsequent testing may very well establish that even lower concentrations than the eighty-eight pound expandable graphite formula described above may meet the FAA fifteen second flammability test parameters.

While the present invention has been described in connection with the utilization of one mil, ninety-nine percent pure aluminum sheets, less significant benefits may be achieved by utilizing one mil or thinner aluminized reflective sheets of Mylar polyester adhesively bonded to one or both surfaces of the insulation material of the present invention.

Once the insulation material of the present invention has been exposed to a level of heat sufficient to activate the expandable graphite particles, the entire activated area of the insulation material should be cut out and replaced. The expandable graphite particles, once activated, remain in the expanded volume state permanently.

It will be readily apparent to those skilled in the art that the disclosed fire retardant thermal and acoustic insulation material may be modified in numerous ways and may assume many embodiments other than the preferred forms specifically set out and described above. Accordingly, it is intended by the appended claims to cover all such modifications of the invention which fall within the true spirit and scope of the invention.

I claim:

1. A fire retardant thermal and acoustic insulation material comprising:
   a. a non-woven air permeable fiber pad formed from a plurality of crosslinked and interlocked elongated fiber strands defining a non-uniform open structural lattice, the fiber pad having a generally uniform thickness with non-uniform first and second side surfaces defined by a plurality of exposed, interlocked fiber strands; and
   b. a first non-uniform open three-dimensional grid of spaced apart, expandable graphite particles having a normal volume and a heat-activated, substantially expanded volume wherein the grid is defined by a plurality of expandable graphite particles bonded at randomly spaced apart intervals to individual fiber strands of the open structural lattice to yield a particle to Particle distribution density sufficient to form a fire resistant barrier to air flow across a defined region of the fiber pad when that defined region is exposed to a source of heat and the expandable graphite particles within that region are activated to convert individual particles from the normal volume to the expanded volume.

2. The fire retardant thermal and acoustic insulation material of claim 1 wherein the first grid of expandable graphite is located in proximity to the first side surface.

3. The fire retardant thermal and acoustic insulation material of claim 2 wherein the first grid of expandable graphite particles extends to a predetermined depth below the first side surface.

4. The fire retardant thermal and acoustic insulation material of claim 2 wherein the particle distribution density of the first grid of expandable graphite particles is highest in proximity to the first side surface and decreases as a function of spacing from the first side surface.

5. The fire retardant thermal and acoustic insulation material of claim 4 further including a second grid of spaced apart, expandable graphite particles located in proximity to the second side surface.

6. The fire retardant thermal and acoustic insulation material of claim 5 wherein the second grid of expandable graphite particles extends to a predetermined depth below the second side surface.

7. The fire retardant thermal and acoustic insulation material of claim 6 wherein the particle distribution density of the second grid of expandable graphite particles is highest in proximity to the second side surface and wherein the particle distribution density of the first grid of expandable graphite particles is highest in proximity to the first side surface and decreases as a function of spacing from the first side surface.

8. The fire retardant thermal and acoustic insulation material of claim 1 wherein the first grid of expandable graphite particles is bonded to fiber strands by a cured liquid adhesive.

9. The fire retardant thermal and acoustic insulation material of claim 8 wherein the fiber strands are held in an interlocking configuration by a cured liquid adhesive.

10. The fire retardant thermal and acoustic insulation material of claims 8 or 9 wherein the liquid adhesive includes a latex adhesive.

11. The fire retardant thermal and acoustic insulation material of claim 9 wherein the fiber strands are impregnated with a filler material.

12. The fire retardant thermal and acoustic insulation material of claim 11 wherein the filler material includes a finely granulated clay.

13. The fire retardant thermal and acoustic insulation material of claim 2 further including a first layer of metallic foil bonded to the first side surface.

14. The fire retardant thermal and acoustic insulation material of claim 13 further including a second non-uniform open three-dimensional grid of spaced apart, expandable graphite particles located in proximity to the second side surface.

15. The fire retardant thermal and acoustic insulation material of claim 14 further including a second layer of metallic foil bonded to the second side surface.

16. The fire retardant thermal and acoustic insulation material of claims 13 or 15 wherein the metallic foil includes aluminum foil.

17. The fire retardant thermal and acoustic insulation material of claim 1 wherein the pad includes a thickness and the pad thickness is not substantially increased in response to exposure of the defined region of the fiber pad to the source of heat and conversion of the exposed particles within that region from the normal volume to the expanded volume.

18. The fire retardant thermal and acoustic insulation material of claim 2 wherein the fiber pad is a first fiber pad and further including:
   a. a second non-woven air permeable fiber pad formed from a plurality of crosslinked and interlocked elongated fiber strands defining a non-uniform open structural lattice, the second fiber pad having a generally uniform thickness with non-uniform first and second side surfaces defined by a plurality of exposed, interlocked strands, the first and second fiber pads being coupled together;
   b. a second non-uniform open grid of spaced apart, expandable graphite particles having a normal volume and a heat-activated, substantially expanded volume wherein the grid is defined by a plurality of expandable graphite particles bonded at randomly spaced apart intervals to individual fiber strands of the open structural lattice to yield a particle to particle distribution density sufficient to form a fire resistant barrier to air flow across a defined region of the fiber pad when that defined region is exposed to a source of heat and the expandable graphite particles within that region are activated to convert individual particles from the normal volume to the expanded volume, wherein the second grid of expandable graphite particles is located in proximity to the first side surface of the second fiber pad; and
   c. a first layer of metallic foil bonded to either the first or second side surface of the first fiber pad and a second layer of metallic foil bonded to either the first or second side surface of the second fiber pad.

19. The fire retardant thermal and acoustic insulation material of claim 1 wherein the ratio of the heat activated volume to the normal volume exceeds 20 to 1.

20. The fire retardant thermal and acoustic insulation material of claim 19 wherein the ratio of the heat activated volume to the normal volume exceeds 100 to 1.

21. The fire retardant thermal and acoustic insulation material of claim 1 wherein the ratio of the heat activated volume to the normal volume exceeds 150 to 1.

22. The fire retardant thermal and acoustic insulation material of claim 7 wherein the fiber strands are derived from recycled cloth material.

23. In a non-woven air permeable textile clipping pad having an exterior surface and being formed from a plurality of elongated fiber strands maintained in a crosslinked and interlocked configuration by a bonding material to define a non-uniform structural lattice, the improvement comprising; forming a non-uniform open three-dimensional grid of spaced apart expandable graphite particles in proximity to the exterior surface of the pad by bonding individual graphite particles to individual fiber strands of the open structural lattice to yield a particle to particle distribution density sufficient to form a fire resistant barrier to air flow across a defined region of the pad when that defined region is exposed to a source of heat and the expandable graphite particles within that region are activated to convert individual particles from a normal volume to a heat-activated, substantially expanded volume.

24. The non-woven, textile clipping pad of claim 23 wherein the bonding material comprises an adhesive bonding material.

25. The non-woven, textile clipping pad of claim 24 wherein the adhesive bonding material includes a latex adhesive.

26. A method for making a fire retardant thermal and acoustic insulation material comprising the steps of:
   a. forming a non-woven air permeable fiber pad having first and second side surfaces by arranging a plurality of fiber strands into layers and by combining a series of layers into a single mat;
   b. compressing the first and second side surfaces of the pad to reduce the spacing between the side surfaces and injecting a pressurized mixture of a liquid bonding material and expandable graphite particles into at least the first side surface of the pad to produce a first region of fiber strands extending to a predetermined distance from the first side surface wetted by the liquid bonding agent and including a predetermined distribution density of expandable graphite particles; and
   c. drying the pad to extract the liquid from the liquid bonding material to thereby bond the fiber strands into an air permeable crosslinked and interlocked non-uniform structural lattice to produce a pad having a generally uniform thickness with non-uniform first and second side surfaces defined by a plurality of exposed, interlocked strands, whereby the expandable graphite particles include a normal volume and a heat-activated, substantially expanded volume and wherein the drying step further bonds the expandable graphite particles to the fiber strands to create a first non-uniform open thee-dimensional grid of spaced apart particles retained in place by the lattice of fiber strands with a particle to particle distribution density sufficient to form a fire resistant barrier to air flow across a first defined region of the fiber pad when that defined region is exposed to a source of heat and the expandable graphite particles within that region are activated to convert individual particles from the normal volume to the expanded volume.

27. The method of claim 26 wherein the particle distribution density of the first grid of expandable graphite particles is highest in proximity to the first side surface and decreases as a function of spacing from the first side surface.

28. The method of claim 26 including the further step of injecting the pressurized mixture of liquid bonding material and expandable graphite particles into the second side surface of the pad to produce a second region of fiber strands extending to a predetermined distance from the second side surface wetted by the liquid bonding agent and including a predetermined distribution density of expandable graphite particles.

29. The method of claim 28 wherein the drying step creates a second non-uniform open three-dimensional grid of spaced apart particles retained in place by the lattice of fiber strands with a particle to particle distribution density sufficient to form a fire resistant barrier to air flow across a second defined region of the fiber pad when that defined region is exposed to a source of heat and the expandable graphite particles within that region are activated to convert individual particles from the normal volume to the expanded volume.

30. The method of claims 26 or 29 including the further step of needle punching the pad to assist in compressing the first and second side surfaces of the pad and to facilitate the step of injecting the pressurized mixture of liquid bonding material and expandable graphite particles into the pad.

31. The method of claim 26 including the further step of bonding a first layer of metallic foil to the first side surface of the pad after completion of the drying step.

32. The method of claims 26 or 29 including the further steps of bonding a first layer of metallic foil to the first side surface of the pad and bonding a second layer of metallic foil to the second side surface of the pad after completion of the drying step.

33. The method of claim 26 wherein the steps of compressing the first and second side surfaces of the pad and injecting the pressurized mixture into the pad are performed simultaneously.

34. The method of claim 26 wherein the pressurized mixture injected into the pad further includes finely granulated clay particles.

35. The method of claim 26 wherein the liquid bonding material and expandable graphite particles are injected with air to form a foam mixture and wherein the pressurized foam mixture is injected into the pad.

36. The method of claim 26 including the further step of mixing the liquid bonding material and the expandable graphite particles together to form a slurry.

37. A fire retardant thermal and acoustic insulation material comprising:

a. a non-woven air permeable fiber pad formed from a non-homogeneous mixture of crosslinked and interlocked fiber strands defining a non-uniform open structural lattice; and b. a first, non-uniform open three-dimensional grid of spaced apart expandable graphite particles bonded at randomly spaced apart intervals to individual fiber strands of the structural lattice and having an unexpanded normal particle volume capable of being converted into a substantially expanded particle volume upon exposure to a predetermined temperature, the grid of spaced apart particles being configured to maintain the open, air permeable characteristic of the fiber pad structural lattice until a defined region of the grid is exposed to a source of heat producing a temperature exceeding the predetermined temperature and the exposed particles within that region are converted from the normal particle volume into the expanded particle volume causing adjacent expanded particles to come into physical contact and form a substantially air impervious, fire resistant thermal barrier.

38. The fire retardant thermal and acoustic insulation material of claim 37 wherein the fiber pad includes first and second side surfaces defining a pad thickness and wherein the pad thickness is not substantially increased as a result of exposure of the defined region of the grid to the heat source and conversion of the exposed particles in that region from the normal particle volume into the expanded particle volume.

39. The fire retardant thermal and acoustic insulation material of claim 37 wherein the fiber pad includes first and second substantially planar side surfaces defining a pad thickness and wherein a substantial portion of the fiber strands defining the first and second side surfaces extend in a direction substantially parallel to the plane of the side surfaces.

* * * * *